(12) United States Patent
Hellkvist et al.

(10) Patent No.: US 10,642,636 B2
(45) Date of Patent: May 5, 2020

(54) METHOD AND CLOUD MANAGEMENT NODE FOR ENABLING A VIRTUAL MACHINE

(71) Applicant: TELEFONAKTIEBOLAGET L M ERICSSON (PUBL), Stockholm (SE)

(72) Inventors: Stefan Hellkvist, Stockholm (SE); Jan-Erik Mångs, Solna (SE); Joacim Halén, San Jose, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/654,469

(22) PCT Filed: Dec. 21, 2012

(86) PCT No.: PCT/SE2012/051485
§ 371 (c)(1),
(2) Date: Jun. 19, 2015

(87) PCT Pub. No.: WO2014/098688
PCT Pub. Date: Jun. 26, 2014

(65) Prior Publication Data
US 2015/0331707 A1    Nov. 19, 2015

(51) Int. Cl.
*G06F 9/455* (2018.01)
*H04L 12/911* (2013.01)
(Continued)

(52) U.S. Cl.
CPC .......... *G06F 9/45558* (2013.01); *G06F 8/63* (2013.01); *H04L 47/827* (2013.01);
(Continued)

(58) Field of Classification Search
None
See application file for complete search history.

(56) References Cited

U.S. PATENT DOCUMENTS

2004/0181476 A1* 9/2004 Smith .................. G06Q 40/00
  705/35
2009/0300607 A1 12/2009 Ferris et al.
(Continued)

FOREIGN PATENT DOCUMENTS

CN   102801636 A   11/2012
WO   2011152910 A1 12/2011

OTHER PUBLICATIONS

Schmidt et al., Efficient Distribution of Virtual Machines for Cloud Computing, 2010, IEEE Computer Society, In Proceedings of the 2010 18th Euromicro Conference on Parallel, Distributed and Network-based Processing (PDP '10), 567-574.*
(Continued)

*Primary Examiner* — Duy Khuong T Nguyen
*Assistant Examiner* — Melissa A Headly
(74) *Attorney, Agent, or Firm* — NDWE LLP

(57) ABSTRACT

A method and a cloud management node for enabling usage of a virtual machine in a distributed cloud of resources for processing and storing of data. When receiving a VM image from a client with a set of files of an operating system for running the virtual machine, the cloud management node distributes the VM image to a plurality of local data centers forming the distributed cloud. In return, the cloud management node receives local identifications of the VM image from the local data centers, and creates a mapping between the received local identifications and a global identification of the VM image. The global identification is then returned to the client, thereby enabling the client to change the VM image in the local data centers by referring to the global identification in communication with the cloud management node.

18 Claims, 5 Drawing Sheets

(51) Int. Cl.
*G06F 8/61* (2018.01)
*H04L 29/08* (2006.01)
(52) U.S. Cl.
CPC ............... *G06F 2009/4557* (2013.01); *G06F 2009/45562* (2013.01); *G06F 2009/45595* (2013.01); *H04L 67/1097* (2013.01)

(56) References Cited

U.S. PATENT DOCUMENTS

| | | | |
|---|---|---|---|
| 2012/0226804 | A1* | 9/2012 | Raja ...................... H04L 43/028 709/224 |
| 2013/0097600 | A1* | 4/2013 | Cardona ............. G06F 9/45558 718/1 |

OTHER PUBLICATIONS

Schmidt et al., Efficient Distribution of Virtual Machines for Cloud Computing, 2010, IEEE Computer Society, In Proceedings of the 2010 18th Euromicro Conference on Parallel, Distributed and Network-based Processing (PDP '10), 567-574 (Year: 2010).*

Schmidt, M., et al., "Efficient Distribution of Virtual Machines for Cloud Computing," 2010 18th Euromicro Conference on Parallel, Distributed and Network-based Processing; pp. 567-574, Feb. 17-19, 2010.

Wartel, R., et al., "Image Distribution Mechanisms in Large Scale Cloud Providers," 2nd IEEE International Conference on Cloud Computing Technology and Science; pp. 112-117; Nov. 30-Dec. 3, 2010.

Moreno-Vozmediano, R., et al., "IaaS Cloud Architecture: From Virtualized Datacenters to Federated Cloud Infrastructures," Computer, vol. 45, No. 12, pp. 65-72, Dec. 2012.

Tordsson, J., et al., "Cloud brokering mechanisms for optimized placement of virtual machines across multiple providers," Future Generation Computer Systems, vol. 28, Issue 2, pp. 358-367, Feb. 2012.

Rodero-Merino, L., et al., "From infrastructure delivery to service management in clouds," Future Generation Computer Systems, vol. 26, Issue 8, pp. 1226-1240, Oct. 2010.

Peng, et al., VDN: Virtual Machine Image Distribution Network for Cloud Data Centers, 2012 Proceedings IEEE NFOCOM, pp. 181-189, Mar. 25, 2012.

Communication Pursuant to Article 94(3) EPC for Application No. 12890356.4, dated Jan. 2, 2018, 6 pages.

Communication pursuant to Rules 70(2) and 70a(2) EPC for Application No. 12890356.4, dated Jul. 15, 2016, 1 page.

Extended European Search Report for Application No. 12890356.4, dated Jun. 28, 2016, 8 pages.

International Preliminary Report on Patentability for Application No. PCT/SE2012/051485, dated Jul. 2, 2015, 12 pages.

International Search Report and Written Opinion for Application No. PCT/SE2012/051485, dated Feb. 7, 2014, 9 pages.

First Office Action for CN Application No. 2012800778799, dated Dec. 18, 2017, 11 page.

Communication under Rule 71(3) EPC for Application No. 12890356.4, dated Dec. 13, 2018, 74 pages.

Second Office Action for CN Application No. 201280077879.9, dated Aug. 30, 2018, 8 pages.

Notification to Grant, CN App. No. 201280077879.9, dated Feb. 13, 2019, 3 pages.

Examination Report, IN App. No. 3518/DELNP/2015, dated Dec. 27, 2019, 8 pages.

* cited by examiner

METHOD AND CLOUD MANAGEMENT NODE FOR ENABLING A VIRTUAL MACHINE

This application is a 371 of International Application PCT/SE2012/051485, filed Dec. 21, 2012, the disclosure of which is fully incorporated herein by reference.

TECHNICAL FIELD

The present disclosure relates generally to a method and a cloud management node for enabling usage of a virtual machine in a distributed cloud of resources for processing and storing of data, which may comprise hardware and software resources.

BACKGROUND

In the field of data handling, clients such as different companies, enterprises, organizations and authorities have a need for hardware and software resources in order to perform various data processing and storing operations. In this disclosure, the term "resources" is used for short to represent any hardware and software that can be used for computer executed operations such as data processing, calculations, compilations and data storing.

Traditionally, the clients themselves own and maintain all the resources they need which can be quite costly and time-consuming, though. For example, considerable knowledge is required to first find out what type of resources is needed and to acquire and install those resources. The client thus often needs to employ skilled staff and/or hire consultants to enable efficient use of resources. Furthermore, as the technique is developing and progressing rapidly particularly in the field of computers and software, purchased or hired resources tend to become out-of-date very quickly and must frequently be replaced by new resources with better performance, which is naturally costly and time-consuming. Another problem is that a client may need a great amount of resources for a very limited period to make some large operation once or just a few times a year, e.g. related to economics, statistics or stock inventory, while very little resources are used during the remainder periods. The client thus has to make investments in resources enough to cope with such peak usage.

In recent years, the concept of cloud computing has emerged to solve the above problems for clients who instead can utilize pooled resources maintained by cloud providers in large data centers with a huge range of computers and data storages. Such data centers with huge amounts of resources are commonly referred to as "the cloud" which term will be used hereafter. Effectively, all the needed capacity is available from the cloud provider and the clients do not have to make their own investments in costly resources. Resources in the cloud are dynamically allocated to clients on a temporary basis, to be released after the client has been served. New resources in the cloud can be allocated again to the client whenever needed. Examples of cloud providers of today include Microsoft, Google and Amazon. Further, some examples of software products commonly used by cloud providers are VMWare, Citrix and Openstack.

A client is thus able to contact a cloud provider to create a so-called "virtual machine" (VM) comprising resources allocated in the cloud as needed and required by the client who can then use the VM basically in the same way as if corresponding resources were owned and hosted by the client himself. In order to achieve that, a so-called "VM image", associated with the VM, is installed and stored in the cloud which VM image is comprised of a system of files of an operating system configured to run the VM. The VM image thus provides a means to handle input data and process requests from the client when the VM is running in the cloud. To allow a complete installation of a VM, the VM image often includes a considerable chunk of data of a size typically ranging from 1 GB to 300 GB or even more depending on the requirements of the associated VM.

A VM image may be stored in various formats which may include a set of standard, or "default", VM image formats commonly used by clients which can be preconfigured in the cloud and readily available. Alternatively, a client can create his own tailored VM image with specific requirements and upload it to the cloud for installation, and the two alternatives above will be referred to as "standard VM images" and "specific VM images", respectively, in this disclosure.

A communication scenario for cloud computing is schematically shown in FIG. 1 in which a data center 100, forming a cloud of resources, is maintained by a cloud provider. In the cloud, a multitude of VMs 102 can be created for different clients, each VM being comprised of a set of temporarily allocated resources, and different VM images which have been installed as described above, may be used for running the VMs. Further, one VM image can be used to run several VMs or "VM instances". The VMs 102 and associated VM images are managed by a function denoted cloud management 104 which may be implemented in a suitable network node. The cloud management 104 in this context is also commonly referred to as the "cloud orchestration layer". In this example, a client 106 uploads his own specific VM image to the cloud management 104, shown in an action 1:1, for installation in the cloud. Alternatively, a client can just chose a standard VM image already available and installed in the cloud for running a VM.

The cloud management 104 installs and stores the uploaded VM image 102b in the cloud, in an action 1:2, to work as an operating system for running the VM 102a. The cloud management 104 also returns an image identification to the client, in an action 1:3, which will be referenced by the client 106 in a request to the cloud management 104, indicated by an action 1:4, for creating the VM. The cloud management 104 then allocates the needed resources to create the VM 102a for client 106, in a next action 1:5, the resources being controlled by the operating system files in the VM image 102b when running the VM. The image identification is also referenced whenever the client 106 wants to change the VM image 102b in some way, e.g. delete, update or modify it, as indicated by another action 1:6. For example, it may be desired to change some metadata of the image such as its name, permissions to use the VM image, login details, and so forth. The client 106 can make such a change of the VM image 102b by communicating over a suitable Application Programming Interface (API), not shown, to access the operating system of the VM image 102b.

In the above example, all resources are assumed to be located in the same data center of a single cloud. Sometimes, the client operates from several widely separated locations, e.g. in different countries, and in that case it would be efficient to use a distributed cloud with several local data centers forming clouds located near the client and using local protocols, formats and APIs. A reason for using such a scenario might be that the general network latency and need for network bandwidth can be reduced thanks to shorter communication paths, and/or that certain information needed for the VM may be only available to the respective local data centers, e.g. cell-related information of a cellular network for wireless communication. The above-described VM and associated VM image must then be installed in each cloud which may be managed by different cloud providers. For example, one cloud may be managed by Google, another by Amazon, and so forth. It is thus possible for a client to use a distributed heterogeneous cloud comprising a plurality of local data centers with VMs and associated VM images, to overcome various limitations e.g. relating to network latency, network bandwidth, and application specific requirements.

However, it is a problem when such a distributed heterogeneous cloud is used that the client must upload his VM image multiple times in several local data centers. As mentioned above, a VM image with operating system files may be of 300 GB size or more and uploading such an amount of data to different data centers perhaps 30 times or more using several different protocols, image formats and APIs, is quite a burdensome task for any client if a distributed cloud is wanted.

Another problematic issue is that each local cloud management, using its own protocols, formats and API, will return a local VM identification to the client who may end up with a variety of different VM identifications of the same VM image in different data centers and the local VM identifications may even overlap with one another. The client is thus required to communicate with several different data centers of a distributed heterogeneous cloud, using different procedures, protocols, formats and APIs, and to handle different returned VM identifications of the same image with the risk of mixing up the different VM identifications.

SUMMARY

It is an object of embodiments described herein to address at least some of the problems and issues outlined above. It is possible to achieve these objects and others by using a method and a cloud management node as defined in the attached independent claims.

According to one aspect, a method is performed by a cloud management node for enabling usage of a virtual machine in a distributed cloud of resources for processing and storing of data. In this method, the cloud management node receives a VM image from a client, the VM image comprising a set of files of an operating system for running the virtual machine. The VM image is then distributed to a plurality of local data centers forming the distributed cloud. In return, the cloud management node receives local identifications of the VM image from the local data centers which local identifications may be different in different local data centers and/or may in some cases more or less overlap with one another. The cloud management node creates a mapping between the received local identifications and a global identification of the VM image, and returns the global identification to the client. Thereby, the client is enabled to change the VM image in the local data centers by referring to the global identification in communication with the cloud management node without having to handle the different local identifications. It is also an advantage that the client communicates with the cloud management node only for handling the VM image and does not need to deal with any specific protocols, formats or procedures used in the local data centers.

According to another aspect, a cloud management node is configured to enable usage of a virtual machine in a distributed cloud of resources for processing and storing of data The cloud management node comprises a communicating unit adapted to receive a VM image from a client, the VM image comprising a set of files of an operating system for running the virtual machine. The cloud management node also comprises a distributing unit adapted to distribute the VM image to a plurality of local data centers forming the distributed cloud, and to receive local identifications of the VM image from the local data centers. The cloud management node further comprises a mapping unit adapted to create a mapping between the received local identifications and a global identification of the VM image. The communicating unit is further adapted to return the global identification to the client, thereby enabling the client to change the VM image in the local data centers by referring to the global identification in communication with the cloud management node.

The above method and node may be configured and implemented according to different optional embodiments. In one possible embodiment, the VM image may be distributed to the local data centers by means of local image service agents associated with the respective local data centers. The local image service agents are adapted to translate between a global protocol for Create, Read, Update and Delete (CRUD) operations on the VM image used by the cloud management node and a local protocol for the CRUD operations used by each respective local data center. The local image service agents may be situated in the respective local data centers or in the cloud management node.

In further possible embodiments, the VM image may be represented by a generic data block and at least one adaptation block, the generic data block already being installed in the local data centers, and wherein the VM image is distributed by distributing the at least one adaptation block to the local data centers.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
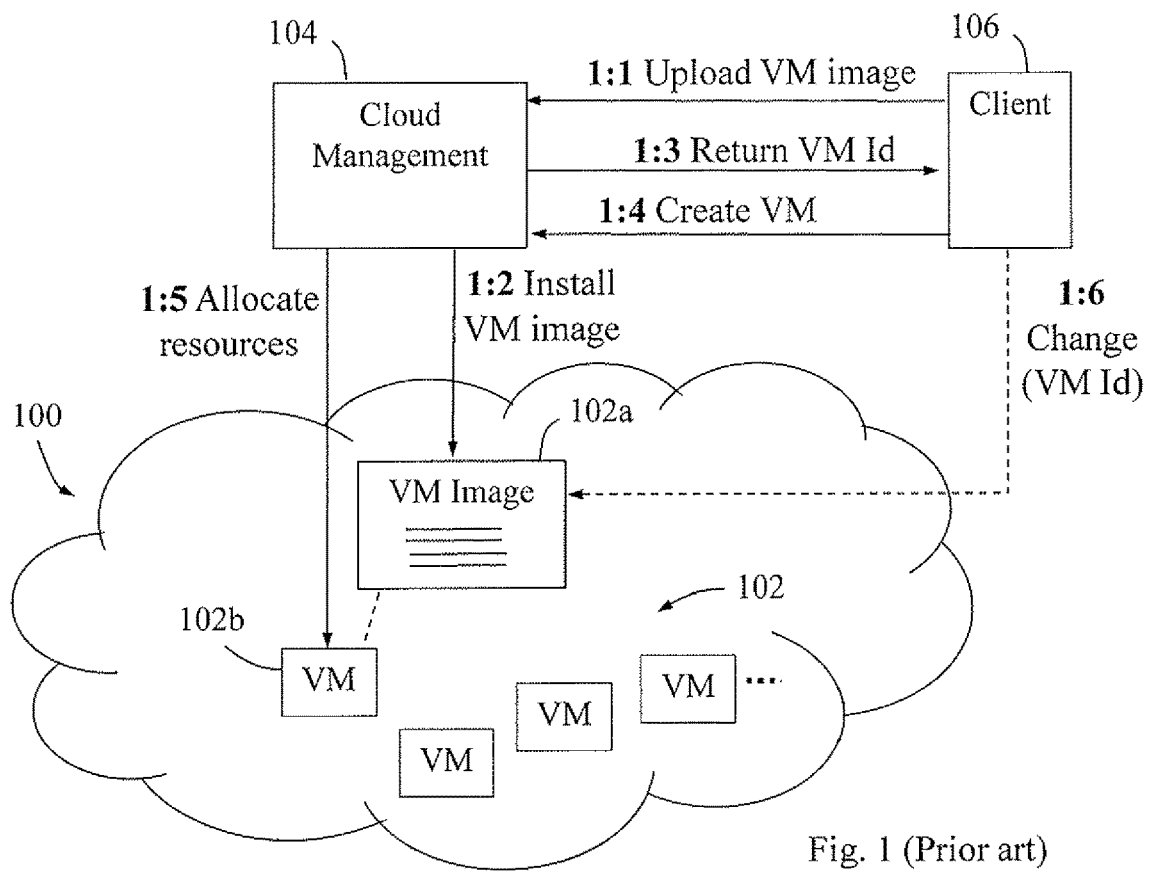
FIG. 1 is a communication scenario illustrating how a VM image can be deployed in a cloud of resources, according to the prior art.

Briefly described, a solution is provided to enable a client to deploy and use a virtual machine (VM) by means of a VM image in a distributed cloud of resources across a plurality of local data centers, without requiring that the client needs to communicate with each respective data center. This can be achieved by means of a central cloud management node which communicates with the local data centers and distributes the client's VM image thereto on behalf of the client which only needs to communicate with the central cloud management node. As mentioned above, a VM image comprises a set of files of an operating system for running the virtual machine. The local data centers return local identifications associated with the client's VM image in respective local data center to the central cloud management node which returns merely a global identification of the VM image to the client. The global identification is mapped to the local identifications at the central cloud management node and the client does not need to deal with the local identifications nor any specific protocols, formats or procedures used in the local data centers.

An example of how a cloud management node can be employed for enabling usage of a VM in a distributed cloud of resources will now be described with reference to the communication scenario shown in FIG. 2. This scenario thus involves a cloud management node 200 serving a client 202 for installing the VM in a plurality of local data centers 204, merely illustrated as clouds here for simplicity. A first shown action 2:1 illustrates that the client 202 sends, or "uploads", a client-specific VM image to the cloud management node 200 for installation in each of the local data centers 204 to enable the client to use a corresponding VM controlled by the VM image in any of the local data centers 204.

The client 202 in this context may in practice be any node controlled by the client which uploads the VM image to the cloud management node 200. The VM image may further be represented by a reference of a "generic" data block, which data block is basically useful for other clients as well, and at least one "adaptation" block which has been created for, and is specifically adapted to, the particular client 202. The at least one adaptation block is thus a part of the VM image that makes the VM image client-specific while the generic data block may comprise a set of commonly used operation files or the like. In that case, the client may just send the reference of the generic data block and upload only the at least one adaptation block if the generic data block is known to the cloud management node 200 and has already been installed in the data centers. The VM image is thus comprised of and can be constructed from the generic data block and the at least one adaptation block.

In a next action 2:2, effectively comprising a set of part-actions 2:2a-d . . . , the cloud management node 200 distributes the received VM image to the local data centers 204 by means of local image service agents associated with the respective local data centers. These local image service agents are specialized and configured to act in accordance with their respective local data centers and the specific protocols and formats used therein which is typically different in different data centers. The local image service agents may be implemented locally in the respective local data centers, as illustrated in this example, or centrally in the cloud management node 200. Such a local image service agent 204a is thus shown in one of the local data centers 204 in this example although it is assumed that a specialized local image service agent is acting for each local data center 204. It should be noted that any number of local data centers 204 may be involved in this procedure and the solution is not limited in this respect.

The local image service agents are adapted to translate between a global protocol and formats used by the cloud management node 200 and local protocols and formats used by the respective local data centers 204. For example, the local image service agents may translate between a global protocol for so-called "CRUD operations", referring to the operations of Create, Read, Update and Delete (CRUD) data in the VM image, and a local protocol for the CRUD operations used by each respective local data center. The agents may also translate between other things such as various formats and other protocols. Each local agent, e.g. 204a, then installs the distributed VM image locally in each respective local data center, e.g. as shown by numeral 204b to be used for running the VM.

Also in this action, each local data center 204 returns a local VM identification to the cloud management node 200 such that a variety of different VM identifications, valid in different local data centers 204, are received for the same VM image and the local VM identifications may even overlap with one another to some extent. The cloud management node 200 can handle this by creating a mapping between the received local identifications and a global identification of the VM image, as shown in an action 2:3. In practice, the cloud management node 200 may create and maintain a mapping table 200a or the like which can be looked up to determine which local identifications correspond to the global identification of the VM image, and vice versa.

The cloud management node 200 the returns the global identification to the client 202, in an action 2:4. Thereby, the client 202 can refer to the returned global identification and does not have to keep track of all the local identifications and the risk for confusion can be avoided. A final shown action 2:5 illustrates that the client 202 is now able to access the VM image in all data centers 204, e.g. for changing or deleting it, by merely communicating with the cloud management node 200 which then acts on behalf of the client in communication with the local data centers 204. Thus, the client only needs to be capable of communicating with one central party and not with all the local data centers 204 which are potentially using a variety of different protocols and formats.

A procedure with actions performed by a cloud management node for enabling usage of a VM in a distributed cloud of resources for processing and storing of data, will now be described with reference to the flow chart in FIG. 3. The cloud management node in this example may act basically as the above-described cloud management node 200 of FIG. 2. A first shown action 300 illustrates that the cloud management node receives a VM image from a client, basically corresponding to action 2:1 in FIG. 2. The VM image comprises a set of files of an operating system for running the virtual machine. As mentioned above, the VM image may be represented by a reference of a generic data block and at least one adaptation block such that the client only needs to send the reference to the generic data block and upload the at least one adaptation block to the cloud management node. The generic data block may comprise a read-only block which cannot be changed while the at least one adaptation block may comprise a writable block which can be changed.

Figure 2:
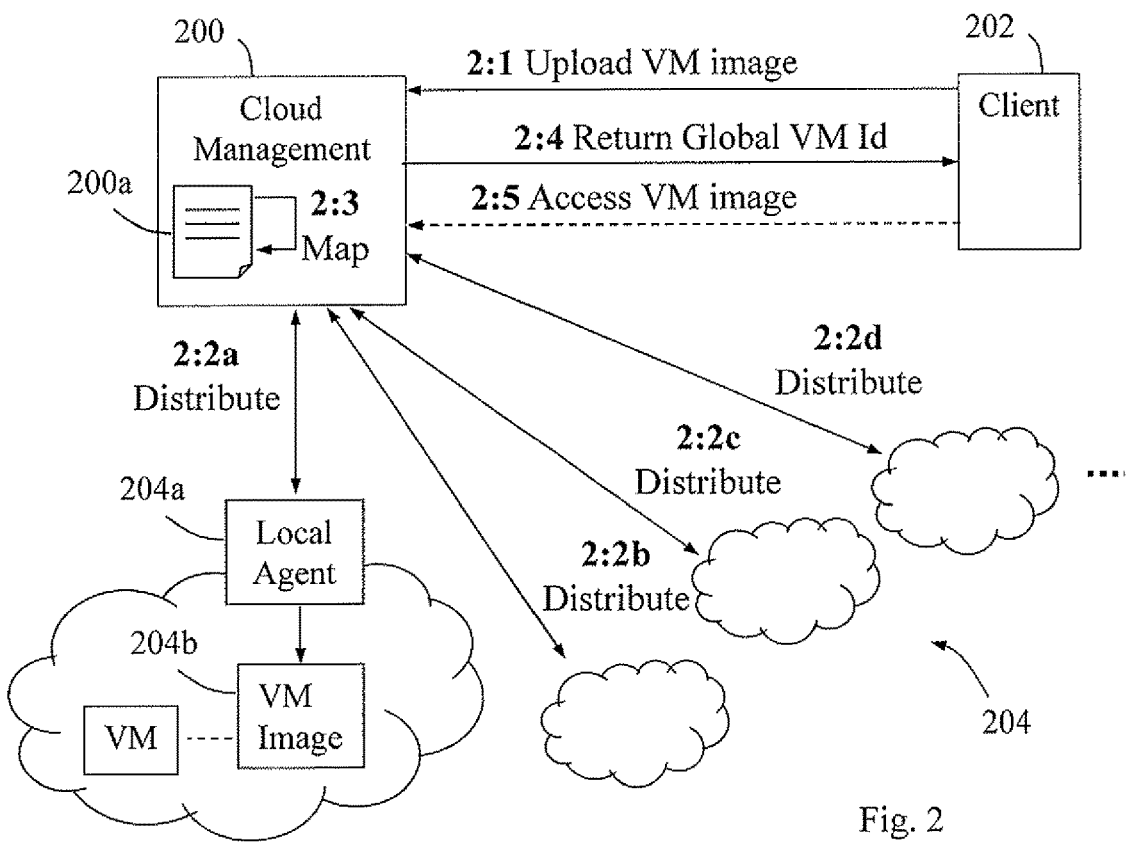
FIG. 2 is a communication scenario illustrating how a VM image can be deployed in a distributed cloud of resources, according to some possible embodiments.
Figure 3:
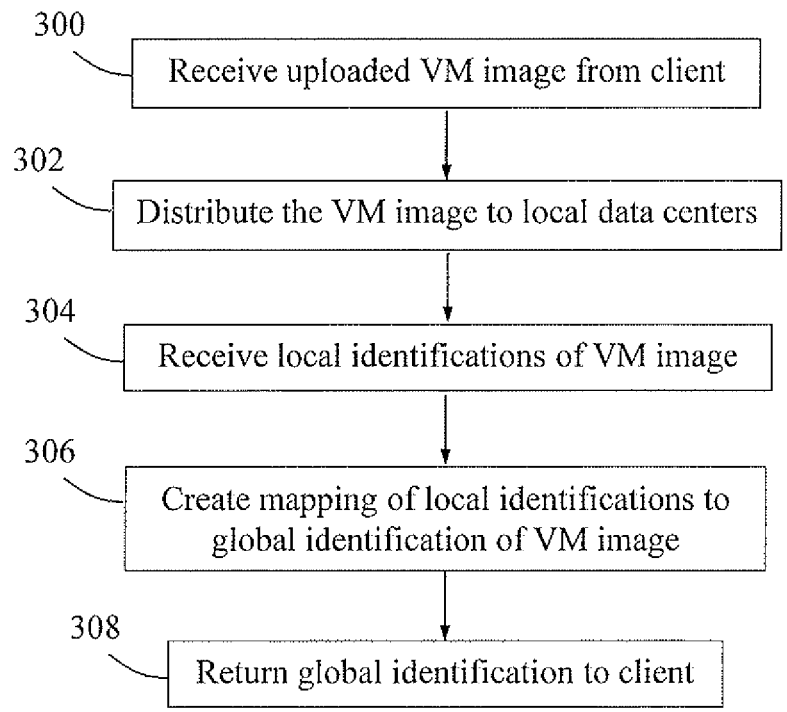
FIG. 3 is a flow chart illustrating a procedure in a cloud management node, according to further possible embodiments.

In a next action 302, the cloud management node distributes the received VM image to a plurality of local data centers forming the distributed cloud, basically corresponding to action 2:2a-d . . . in FIG. 2. The VM image may be distributed to any number of local data centers, i.e. two or more local data centers, and the solution is not limited in this respect.

As described for FIG. 2, the VM image may be distributed by means of local image service agents associated with the local data centers, where the agents are adapted to translate between a global protocol for CRUD operations on the VM image used by the cloud management node and a local protocol for the CRUD operations used by each respective local data center. Each local image service agent may thus be configured with a "northbound" interface towards the cloud management node which northbound interface is configured to use the global protocol and formats in accordance with the cloud management node, and a "southbound" interface towards the respective local data center which southbound interface is configured to use the local protocol and formats in accordance with the local data center. The protocol used by the cloud management node to communicate with the image service agents may be based on XML (Extensible Markup Language), JSON (Java Script Object Notation) and HTTP (Hyper Text Transfer Protocol) and other similar protocols which support the above CRUD operations for VM images.

In a following action 304, the cloud management node receives local identifications of the VM image returned from the local data centers, which local identifications may be different in different data centers and may also overlap with one another to some extent. The cloud management node then assigns a global identification of the VM image and creates a mapping between the received local identifications and the global identification of the VM image, in another action 306, basically corresponding to action 2:3 in FIG. 2. The mapping can be created in the form of a mapping table or the like which can be looked up at a later point to determine which local identifications correspond to the global identification of the VM image, or vice versa.

A last shown action 308 illustrates that the cloud management node returns the global identification of the VM image to the client, basically corresponding to action 2:4 in FIG. 2. Thereby the client is enabled to change the VM image in the local data centers by referring to the global identification in communication with the cloud management node, e.g. as described for action 2:5 in FIG. 2.

The above action 302 of distributing the VM image can be performed in different ways. In a first option, the cloud management node may send all data in the VM image to each one of the local data centers. If the VM image is represented by a reference of a generic data block and at least one adaptation block, and the generic data block is known and has already been installed in the local data centers, the cloud management node only needs to send the data in the at least one adaptation block to the local data centers, which will be further described later below.

In a second option, it is also possible to distribute the VM image based on a peer-to-peer download procedure where the cloud management node acts as a tracker by providing availability information to the local data centers about where the VM image or parts thereof can be found, the local data centers thus acting as peers forming a peer network in the peer-to-peer download. Thereby, the local data centers, or suitably their locally implemented image service agents, are enabled to download the VM image or parts thereof based on the availability information such that different parts are downloaded from different peers, i.e. data centers. This may be a practical option when the amount of data in the VM image is large and when this data shall be distributed to a great number of local data centers, and it would otherwise be burdensome for the cloud management node to distribute all the data multiple times to all the data centers. The cloud management node can in this way share the load of distributing the data with the local data centers.

When the VM image is represented by a reference of a generic data block and at least one adaptation block, and the generic data block has already been installed in the local data centers, the cloud management node may distribute the VM image by distributing the at least one adaptation block to the local data centers, while instructing the local data centers, e.g. by means of the above reference or other identification pointing to the generic data block, to include the generic data block in the VM image for the client together with the distributed at least one adaptation block. In this context, an adaptation block may just contain a difference or addition, or "delta", apart from the generic data block such that the amount of distributed data can be considerably reduced as compared to distributing the complete VM image.

As mentioned above, the VM image can then be updated by adding a new adaptation block to the at least one adaptation block and/or removing any of the at least one adaptation block. Further, the VM image may be updated by adding a chain of successive new adaptation blocks, e.g. one by one in different updating operations. By using a generic data block and at least one adaptation block in the manner described above, it will be easy to execute an updating of the VM image and this operation can be made more efficient in that the amount of communicated data needed for the updating operation can be reduced and possibly minimized.

The above embodiments of using a generic data block and at least one adaptation block will now be explained in more detail. In order to optimize transport of image data, there may be an understanding between the central cloud management node and the local data centers, e.g. represented by the image service agents, about the representation of the VM image and its format. This understanding can be based on the fact that most images, although large in size and mostly unique, often share a substantial portion of the data with other VM images. For example, there may be a group of VM images which are based on a standard "Ubuntu 64 bit server image" which is generally known as such in this field. These VM images thus share a large portion of the file system and kernel but may differ in smaller adaptations, e.g. such that one part may have been setup to be a "MySQL (Structured Query Language) server" while another part may have been setup to be an "Apache web server", and so forth.

By initially, before the distribution, representing a VM image as having one large and generic data block and in addition one or more smaller adaptation blocks, it is possible to share the large generic block once to all the local data centers and later, when creating some derivation of a standard VM image defined by the generic block, just distribute the smaller adaptation blocks. There is for instance a standard file system type for images based on so called "Copy-On-Write structure (COW) where a VM image comprises one block that is read-only and then a writeable block that contains all the changes that have been made on the VM image. Any details changed in the VM image's file system get copied to the writable part which over-shadows the read-only part and the more that is written, the more the writable part grows. A COW image can also be "flattened" into one block so that a new image is formed by the writeable part and the read-only part. A COW writable part could also refer to another COW formatted image, thus it is possible to create extended "chains" of COW blocks. For example, one block may add a file server function, another block may add a web server, yet another block may add user credentials, and so forth.

The COW file format is an example of how the above-described division of the image in different parts could be achieved. This technique can thus be utilized to partition the image data into one large generic data block, forming a "base image" common to all VM images of a certain group of clients, and one or more smaller client-specific adaptation blocks.

In another possible embodiment, the VM image may be locked from reading and writing during periods when the VM image is being updated or installed. This can be a useful precaution to avoid inconsistent usage of the VM image, e.g. at different locations, since the image may comprise different data in different data centers during such periods. Examples of how this can be done will be described later below with reference to the signaling diagrams of FIGS. 5-7. In the field of computing and data handling in general, data can be locked by means of a "read-lock" or a "write-lock", meaning that the read-lock can be applied to data to prevent the data from being changed, it can only be read, while the write-lock is applied to data that is to be changed thus preventing others from both reading and changing the same data during the change. The read-lock is basically used in the following way: 1) Acquire read-lock of data "A", 2) read A, and 3) release read-lock. The write-lock is basically used in the following way: 1) Acquire write-lock of data "B", 2) read B, 3) update B, 4) write B, and 5) release write-lock.

Figure 4:
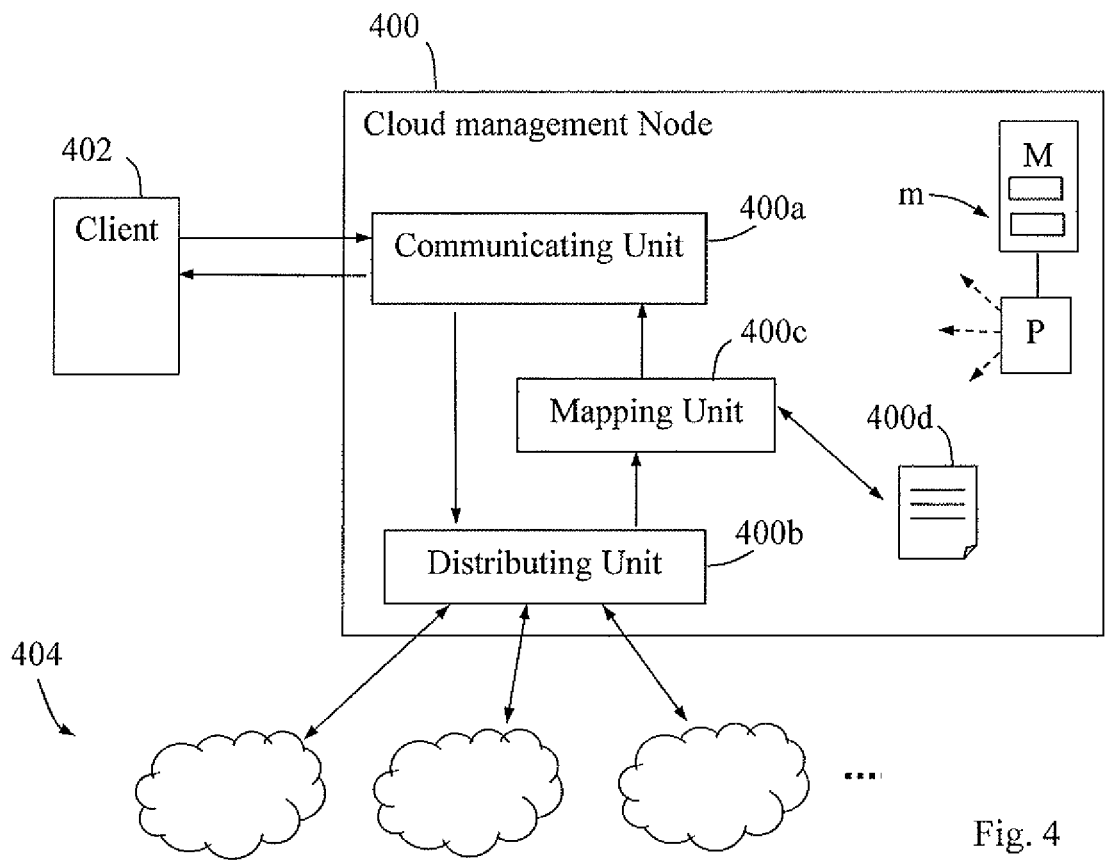
FIG. 4 is a block diagram illustrating a cloud management node in more detail, according to further possible embodiments.

A detailed but non-limiting example of how a cloud management node may be arranged to accomplish the above-described embodiments, is illustrated by the block diagram in FIG. 4. The cloud management node 400 is configured to enable usage of a virtual machine in a distributed cloud 404 of resources for processing and storing of data, e.g. according to the procedures and features described above for any of FIGS. 2 and 3 and the examples shown in FIGS. 5-7 to be described further below. The cloud management node 400 will now be described in terms of a possible example of employing the solution.

The cloud management node 400 comprises a communicating unit 400a adapted to communicate with the client 402 and to receive a VM image from the client 402, the VM image comprising a set of files of an operating system for running the VM, e.g. as described for actions 2:1 and 300 above. As explained above, the VM image, or a part thereof, may be client-specific and therefore not known in beforehand. The VM image may further be represented by a reference of a generic data block that is already known and can be used for other clients as well, and at least one adaptation block specifically created for the client 402.

The cloud management node 400 also comprises a distributing unit 400b adapted to distribute the VM image to a plurality of local data centers 404 forming the distributed cloud, e.g. as described for actions 2:2a-d and 302 above. The VM image may be distributed by means of local image service agents associated with the respective local data centers in the manner described above. The distributing unit 400b is also adapted to receive local identifications of the VM image from the local data centers 404, e.g. as described for actions 2:2a-d and 304 above.

The cloud management node 400 also comprises a mapping unit 400c adapted to create a mapping 400d between the received local identifications and a global identification of the VM image. The communicating unit 400a is further adapted to return the global identification to the client, thereby enabling the client to access change the VM image in the local data centers by referring to the global identification in communication with the cloud management node.

The cloud management node 400 and its functional units 400a-c may be configured or adapted to operate according to various optional embodiments. In a possible embodiment, the distributing unit 400b may be further adapted to distribute the VM image to the local data centers by means of local image service agents associated with the respective local data centers. In this embodiment, the local image service agents are adapted to translate between a global protocol for the above-described CRUD operations on the VM image used by the cloud management node and a local protocol for the CRUD operations used by each respective local data center. In another possible embodiment, the distributing unit 400b may be further adapted to distribute the VM image to the local image service agents when they are situated in the respective local data centers or in the cloud management node.

In further possible embodiments, the VM image may be represented by a reference of a generic data block and at least one adaptation block, the generic data block already being installed in the local data centers, and in that case the distributing unit 400b may be further adapted to distribute the VM image by distributing the at least one adaptation block to the local data centers. The generic data block may comprise a read-only block and the at least one adaptation block comprises a writable block and the distributing unit 400b may be further adapted to update the VM image by adding a new adaptation block. Further, the distributing unit 400b may be adapted to update the VM image by adding a chain of successive new adaptation blocks.

In another possible embodiment, the distributing unit 400b may be further adapted to distribute the VM image based on a peer-to-peer download procedure where the cloud management node acts as a tracker by providing availability information to the local data centers about where the VM image or parts thereof can be found, thus enabling the local data centers to download the VM image or parts thereof based on the availability information. The cloud management node may further be adapted to lock the VM image from reading and writing during periods when the VM image is being updated, as described above.

It should be noted that FIG. 4 illustrates various functional units in the cloud management node 400 and the skilled person is able to implement these functional units in practice using suitable software and hardware. Thus, the solution is generally not limited to the shown structures of the cloud management node 400, and the functional units 400a-c may be configured to operate according to any of the features described in this disclosure, where appropriate.

The functional units 400a-c described above can be implemented in the cloud management node 400 by means of program modules of a respective computer program comprising code means which, when run by a processor "P" causes the cloud management node 400 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the cloud management node 400 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the cloud management node 400.

Figure 5:
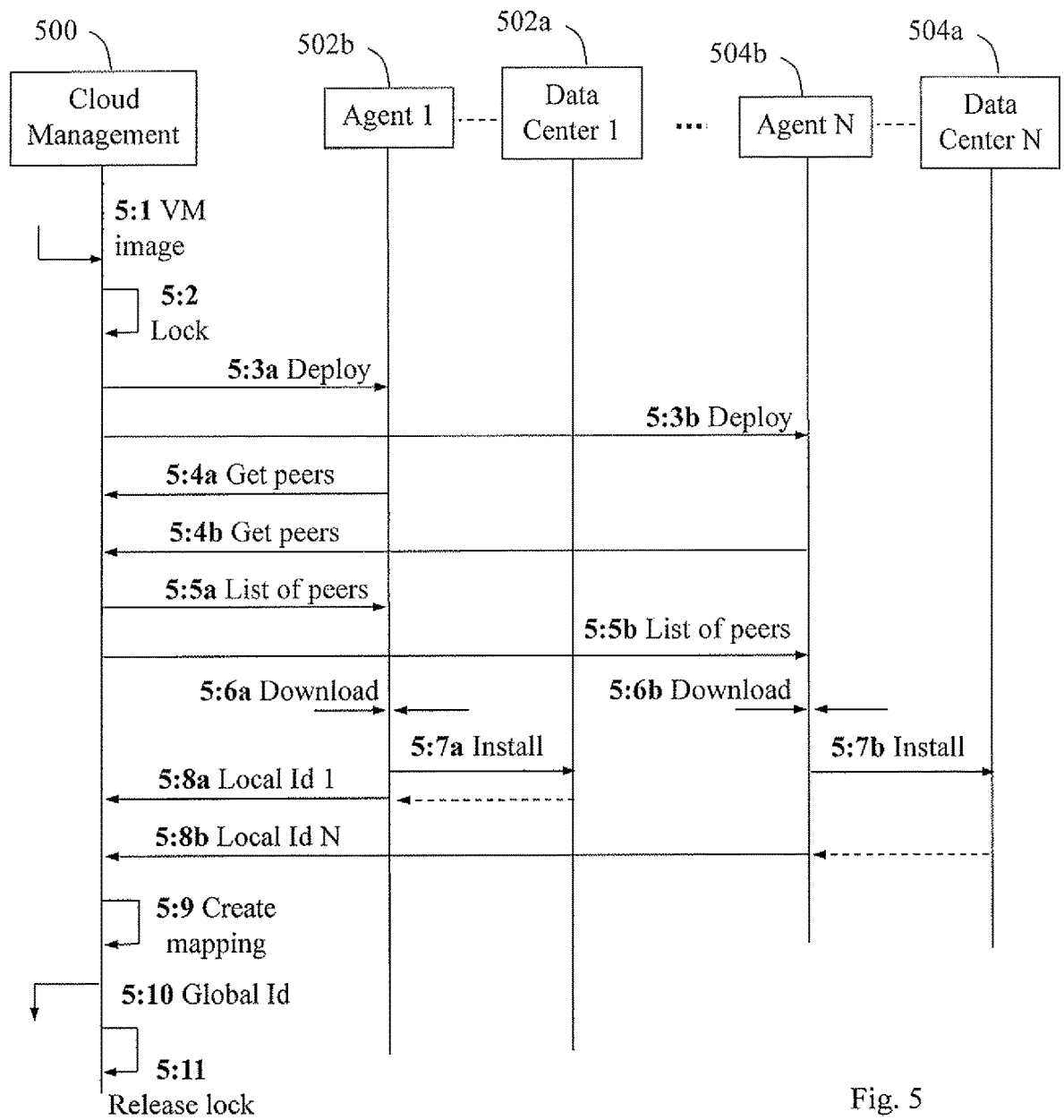
FIG. 5 is a signaling diagram illustrating an example of how a VM image can be deployed in practice, according to further possible embodiments.

An example of how a VM image can be installed in practice by using embodiments herein will now be described with reference to the signaling diagram in FIG. 5. This figure illustrates a cloud management node 500, and a plurality of data centers 1-N and associated image service agents 1-N, in the figure represented by a first pair of local data center 502a and associated agent 502b, and an N:th pair of local data center 504a and associated agent 504b. In this example, a peer-to-peer download procedure is used where the cloud management node 500 acts as a tracker by providing availability information to the local data centers 1-N about where the VM image or parts thereof can be found, for achieving distribution of the VM image.

A first action 5:1 illustrates that the cloud management node 500 receives a VM image from a client, basically corresponding to actions 2:1 and 300 above. The received VM image is thus to be installed in the local data centers 1-N. The cloud management node 500 then locks the VM image from reading and writing during the procedure when the VM image is being installed, as shown by an action 5:2. This may be accomplished by applying a write-lock as described above. In this action, the VM image is locked in order to prevent any service deployment using a VM that the VM image runs, before the VM image has been completely installed in all the local data centers 1-N. If the VM image is not locked, it would be possible to deploy a service by means of several VMs at different locations in the network where the VM images could differ due to the ongoing VM image installation, thus causing inconsistent usage of the VM image.

It should be noted that although parallel actions are described in the following for the shown data centers 502a, 504a and their associated agents 502b, 504b, the same actions are performed for other data centers and agents as well where the VM image is to be installed which are not shown in this simplified figure. In practice, there may be a much greater number of data centers and associated agents involved, e.g. in the range of 20-30. Throughout the examples described here for FIGS. 2-7, the communication between a cloud management node and image service agents may be executed by using the HTTP protocol and JSON or XML documents for carrying information.

In a next shown action 5:3a, the cloud management node 500 sends a message denoted "deploy image" to the agent 502b effectively asking the agent 502b to download the VM image from one or more peers in a peer-to-peer network comprising the data centers. The cloud management node 500 also sends the deploy image message to the agent 504b, in a further action 5:3b.

Further actions 5:4a and 5:4b illustrate that the agents 502b and 504b, respectively, send a message denoted "get peers" to the cloud management node 500, effectively asking for availability information about where the VM image or parts thereof can be found in the peer-to-peer network. In response thereto, the cloud management node 500 sends a list of peers having the VM image or parts thereof, to the agents 502b and 504b, respectively, shown by further actions 5:5a and 5:5b.

Having received the list of peers, the agents 502b and 504b are now able to download different parts of the VM image from different peers according to the peer list, and the download procedure as such is schematically indicated by actions 5:6a and 5:6b, respectively. For example, the well-known "Bittorrent" protocol may be used in this process which is not necessary to describe as such here to understand the shown example.

Having downloaded or otherwise acquired the entire VM image, e.g. according to the list of peers, the agents 502b and 504b proceeds to install the VM image in their respective data centers 502a and 504a, as shown by further actions 5:7a and 5:7b. When the VM image is installed, a local identification 1, N is generated for the VM image in each data center 502a and 504a, as indicated by dashed arrows, and the different local identifications 1, N are sent from the agents 502b and 504b to the cloud management node 500 in respective actions 5:8a and 5:8b.

Having received the local identifications 1-N, the cloud management node 500 creates a mapping between the local identifications and a global identification assigned to the VM image, e.g. in the form of a mapping table or the like, in an action 5:9. The global identification is then provided to the client, as shown by another action 5:10, and the cloud management node 500 finally releases the lock created in action 5:2, as shown by a last action 5:11. It should be noted that the cloud management node 500 may assign the global identification and return it to the client at any point in this procedure, e.g. immediately after receiving the VM image in action 5:1. Thus, the shown action 5:10 could follow at any time after action 5:1.

Figure 6:
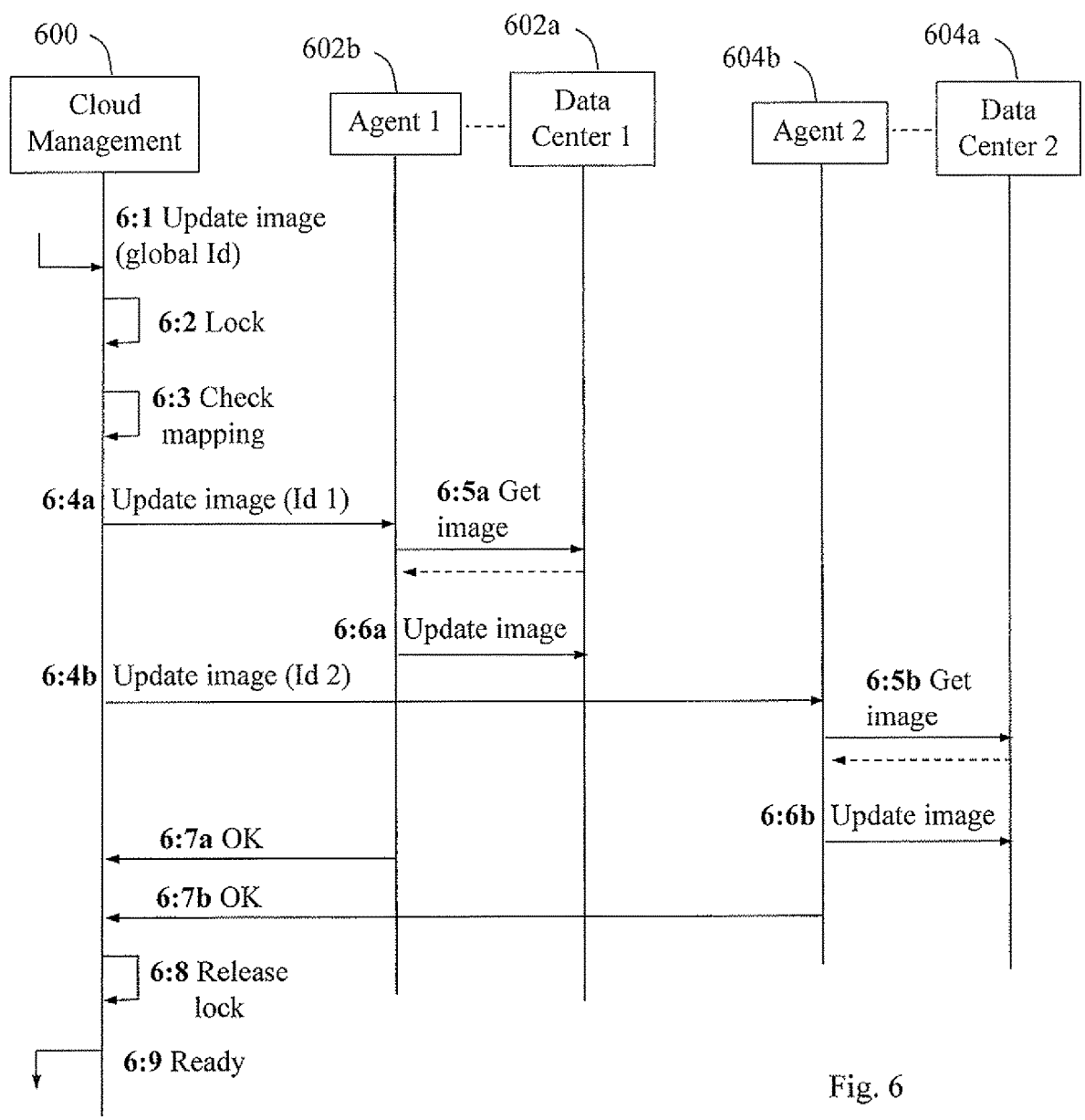
FIG. 6 is a signaling diagram illustrating an example of how a VM image distributed in two data centers can be updated, according to further possible embodiments.

An example of how a previously installed VM image can be updated by a client in practice by using embodiments herein will now be described with reference to the signaling diagram in FIG. 6. Similar to FIG. 5, this figure illustrates a cloud management node 600 and two exemplifying data centers 602a and 604a with associated image service agents 602b and 604b. Even though only two pairs of data centers and agents are shown in this example, the following description is valid for any number of data centers and associated agents. It is assumed that a mapping between a global identification and a plurality of local identifications of the VM image has been created in the cloud management node 600 when the VM image was installed, as in action 5:9 above.

A first action 6:1 illustrates that the cloud management node 600 receives a request from the client, not shown, for updating its VM image, the request referring to the global identification of the VM image such as the one returned to the client in action 5:10 above. This request may contain details regarding how the image shall be updated, e.g. some changed metadata such as changed access authorization, etc. The VM image is thus to be updated in the shown local data centers 602a and 604a, although in reality the VM image should be updated in any number of locations, i.e. data centers, where the VM image has been installed for this client.

The cloud management node 600 then acquires a lock of the VM image, e.g. a write-lock, during the procedure when the VM image is being installed, as shown by an action 6:2. In this action, the VM image is thus locked from both reading and writing by others, in order to prevent any service deployment using a VM that the VM image runs before it has been completely updated in all the local data centers, thereby avoiding inconsistent usage of the VM image across the data centers.

In a next shown action 6:3, the cloud management node 600 checks the mapping between the received global identification and the local identifications of the VM image, e.g. in a mapping table or the like, to determine the local identifications valid for the VM image in the local data centers 602a and 604a. In a further action 6:4a, the cloud management node 600 sends a message denoted "update image" to the agent 602b effectively asking the agent 602b to update the VM image in the data center 602a. A corresponding update image message is also sent to the agent 604b, in a further action 6:4b.

Further actions 6:5a and 6:5b illustrate that the agents 602b and 604b, respectively, retrieve the VM image from the data centers 602a and 604a by means of a message denoted "get image" and the agents 602b and 604b accordingly update the VM image in the respective data centers 602a and 604a, shown by further actions 6:6a and 6:6b. Having completed the image update, each agent 602b, 604b sends an OK message to the cloud management node 600, in respective actions 6:7a and 6:7b, to confirm that the updated VM image is now ready for use to run one or more VMs in their associated data centers 602a and 604a.

When the OK message has been received from agents of all the data centers, the cloud management node 600 releases the lock activated in action 6:2, as shown by an action 6:8. The cloud management node 600 may finally send a suitable confirmation message to the client, in a further action 6:9, informing the client that the update is ready and that the VM image can now be used for running a VM in any of the data centers exemplified by 602a and 604a.

Figure 7:
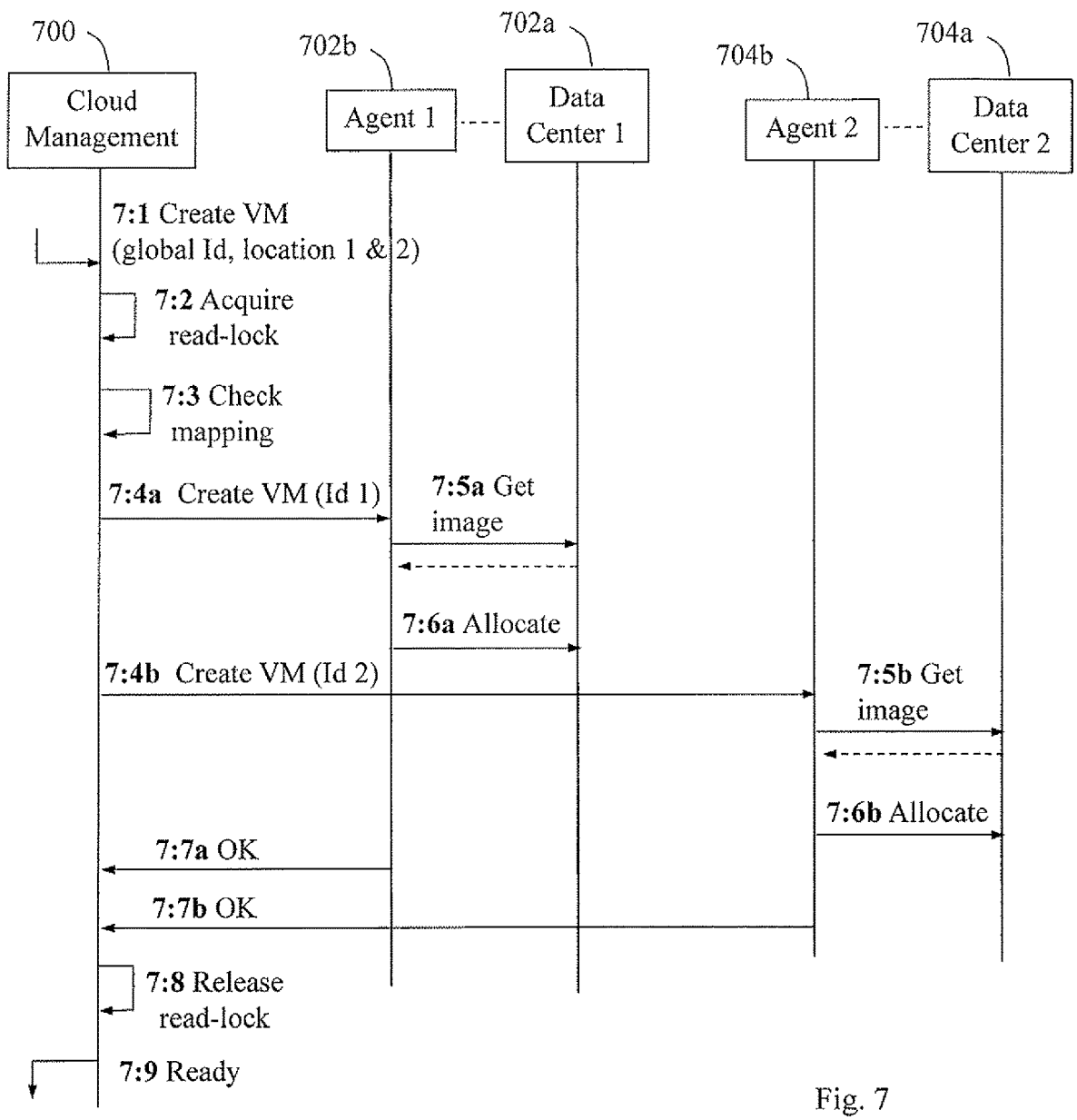
FIG. 7 is a signaling diagram illustrating an example of how a VM can be created in two data centers where a distributed VM image has been installed, according to further possible embodiments.

An example of how a VM can be created and run in practice by means of a previously installed VM image and by using embodiments herein, will now be described with reference to the signaling diagram in FIG. 7. Similar to FIGS. 5 and 6, this figure illustrates a cloud management node 700 and two exemplifying data centers 702a and 704a at locations 1 and 2 with associated image service agents 702b and 704b. Even though only two pairs of data centers and agents are shown in this example, the following description is valid for any number of data centers and associated agents. Also here, it is assumed that a mapping between a global identification and a plurality of local identifications of the VM image has been created in the cloud management node 700 when the VM image was installed, as in action 5:9 above.

A first action 7:1 illustrates that the cloud management node 700 receives a request from the client, not shown, for creating a VM to be run by the VM image for enabling a service. The received request refers to the global identification of the VM image and two locations 1 and 2 pointing to the data centers 702a and 704a. The VM is thus to be created in the shown local data centers 702a and 704a, i.e. at locations 1 and 2, although the VM could be created according to this procedure in any number of locations, i.e. data centers, where the VM image has been installed for this client.

The cloud management node 700 then acquires a read lock of the VM image during the procedure when the VM is being created, as shown by an action 7:2. In this action, the VM image is thus effectively blocked from writing in order to prevent any change of the VM image before the VM has been created in all the local data centers, thereby avoiding inconsistent creation of the VM across the data centers.

In a next shown action 7:3, the cloud management node 700 checks the mapping, e.g. in a mapping table or the like, between the received global identification and the local identifications of the VM image in locations 1 and 2, to determine the local identifications valid for the VM image in the respective local data centers 702a and 704a. In a further action 7:4a, the cloud management node 700 sends a message denoted "create VM" to the agent 702b, referring to the local identification of the VM image used in data center 702a, effectively asking the agent 702b to create the VM according to the VM image in the data center 702a of location 1. A corresponding create VM message is also sent to the agent 704b, in a further action 7:4b.

Further actions 7:5a and 7:5b illustrate that the agents 702b and 704b retrieve the VM image from the data centers 702a and 704a, respectively, by means of a message denoted "get image". Then, the agents 702b and 704b accordingly allocate resources in the respective data centers 702a and 704a in accordance with the retrieved VM image, shown by further actions 7:6a and 7:6b, effectively creating the VM in locations 1 and 2. Having completed the creation of the VM, each agent 702b, 704b sends an OK message to the cloud management node 700, in respective actions 7:7a and 7:7b, to confirm that the created VM is now ready to run by using the VM image in their associated data centers 702a and 704a.

When the OK message has been received from agents of all the data centers, the cloud management node 700 releases the read-lock activated in action 7:2, as shown by an action 7:8. The cloud management node 700 may finally send a suitable confirmation message to the client, in a further action 7:9, informing the client that the VM is ready to be used in any of the data centers exemplified by 702a and 704a at locations 1 and 2.

While the solution has been described with reference to specific exemplary embodiments, the description is generally only intended to illustrate the inventive concept and should not be taken as limiting the scope of the solution. For example, the terms "client", "cloud management node",", "image service agent", "virtual machine", "VM image" and "CRUD operations" have been used throughout this description, although any other corresponding entities, functions, and/or parameters could also be used having the features and characteristics described here. The solution is defined by the appended claims.

The invention claimed is:

1. A method performed by a cloud management node for enabling usage of a virtual machine (VM) in a distributed cloud of resources for processing and storing of data, the method comprising:

receiving a VM image from a client, the VM image comprising a set of files of an operating system for running the VM;

distributing the VM image to a plurality of local data centers forming the distributed cloud to install the VM image in the plurality of local data centers, in order for each of the local data centers to enable the VM, wherein each of the plurality of local data centers uses a respective local protocol to communicate and wherein the distributing of the VM image to the plurality of local data centers is via respective local image service agents that provide protocol translation between a global protocol used by the cloud management node and each respective local protocol used by each respective local data center;

receiving respective local identification of the VM image from each of the plurality of local data centers;

mapping a global identification of the VM image to the received local identifications of the VM image, wherein the global identification is a single global identification mapped to a plurality of the local identifications;

returning the global identification to the client, thereby enabling the client to change, via the cloud management node, the VM image installed in the plurality of local data centers by referring to the global identification, wherein the cloud management node uses mapping of the global identification to access the VM image in the plurality of local data centers;

receiving an adaptation block from the client, along with the global identification, to update the VM image in the plurality of local data centers; and distributing the adaptation block to the plurality of local data centers based on the global identification to update the VM image.

2. The method according to claim 1, wherein the local image service agents being adapted to translate between a global protocol for Create, Read, Update and Delete (CRUD) operations on the VM image used by the cloud management node and a local protocol for the CRUD operations used by each respective local data center.

3. The method according to claim 2, wherein the VM image is distributed to the local image service agents which are situated in the respective local data centers or in the cloud management node.

4. The method according to claim 1, wherein the VM image is represented by a reference of a generic data block portion and at least one adaptation block portion and wherein the adaptation block updates the at least one adaptation block portion.

5. The method according to claim 4, wherein the generic data block portion comprises a read-only block and the at least one adaptation block portion comprises a writable block.

6. The method according to claim 4, wherein the adaptation block updates the VM image by adding a new adaptation block.

7. The method according to claim 6, wherein the VM image is updated by adding a chain of successive new adaptation blocks.

8. The method according to claim 1, wherein the VM image is distributed based on a peer-to-peer download procedure where the cloud management node acts as a tracker by providing availability information to the plurality of local data centers about where the VM image or parts thereof can be found, enabling the plurality of local data centers to download the VM image or parts thereof based on the availability information.

9. The method according to claim 1, wherein the VM image is locked from reading and writing during periods when the VM image is being updated or installed.

10. A cloud management node configured to enable usage of a virtual machine (VM) in a distributed cloud of resources for processing and storing of data, the cloud management node comprising:

a processor; and a memory containing instructions which, when executed by the processor, cause the cloud management node to perform operations to:

receive a VM image from a client, the VM image comprising a set of files of an operating system for running the VM;

distribute the VM image to a plurality of local data centers forming the distributed cloud to install the VM image in the plurality of local data centers, in order for each of the local data centers to enable the VM, wherein each of the plurality of local data centers uses a respective local protocol to communicate and wherein distributing of the VM image to the plurality of local data centers is via respective local image service agents that provide protocol translation between a global protocol used by the cloud management node and each respective local protocol used by each respective local data center, and to receive respective local identification of the VM image from each of the plurality of local data centers via the respective local image service agent; and map a global identification of the VM image to the received local identifications of the VM image, wherein the global identification is a single global identification mapped to a plurality of the local identifications, wherein the global identification is to be returned to the client, thereby enabling the client to change, via the cloud management node, the VM image installed in the plurality of local data centers by referring to the global identification, wherein the cloud management node uses mapping of the global identification to access the VM image in the plurality of local data centers, in order to receive an adaptation block from the client, along with the global identification, to update the VM image in the plurality of local data centers, and to distribute the adaptation block to the plurality of local data centers based on the global identification to update the VM image.

11. The cloud management node according to claim 10, wherein the local image service agents being adapted to translate between a global protocol for Create, Read, Update and Delete (CRUD) operations on the VM image used by the cloud management node and a local protocol for the CRUD operations used by each respective local data center.

12. The cloud management node according to claim 11, further adapted to distribute the VM image to the local image service agents which are situated in the respective local data centers or in the cloud management node.

13. The cloud management node according to claim 10, wherein the VM image is represented by a reference of a generic data block portion and at least one adaptation block portion, and wherein the adaptation block updates the at least one adaptation block portion.

14. The cloud management node according to claim 13, wherein the generic data block portion comprises a read-only block and the at least one adaptation block portion comprises a writable block.

15. The cloud management node according to claim 13, wherein the adaptation block updates the VM image by adding a new adaptation block.

16. The cloud management node according to claim 15, further to update the VM image by adding a chain of successive new adaptation blocks.

17. The cloud management node according to claim 10, further to distribute the VM image based on a peer-to-peer download procedure where the cloud management node acts as a tracker by providing availability information to the plurality of local data centers about where the VM image or parts thereof can be found, enabling the plurality of local data centers to download the VM image or parts thereof based on the availability information.

18. The cloud management node according to claim 10, further to lock the VM image from reading and writing during periods when the VM image is being updated or installed.

* * * * *